US008572062B2

(12) United States Patent (10) Patent No.: US 8,572,062 B2
Felderman et al. (45) Date of Patent: Oct. 29, 2013

(54) INDEXING DOCUMENTS USING INTERNAL INDEX SETS

(75) Inventors: Gregory Scott Felderman, Westminster, CO (US); Brian Keith Hoyt, Thornton, CO (US); Paula Jean Muir, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 12/643,343

(22) Filed: Dec. 21, 2009

(65) Prior Publication Data

US 2011/0153640 A1 Jun. 23, 2011

(51) Int. Cl.
*G06F 7/00* (2006.01)
*G06F 17/30* (2006.01)

(52) U.S. Cl.
USPC ............................. 707/706; 707/711; 707/715

(58) Field of Classification Search
None
See application file for complete search history.

(56) References Cited

U.S. PATENT DOCUMENTS

| | | | | |
|---|---|---|---|---|
| 5,963,205 | A * | 10/1999 | Sotomayor | 715/236 |
| 6,981,217 | B1 * | 12/2005 | Knauft et al. | 715/210 |
| 7,062,707 | B1 * | 6/2006 | Knauft et al. | 715/201 |
| 7,139,756 | B2 | 11/2006 | Cooper et al. | |
| 7,178,099 | B2 * | 2/2007 | Meyer et al. | 715/210 |
| 7,284,199 | B2 * | 10/2007 | Parasnis et al. | 715/201 |
| 7,613,993 | B1 * | 11/2009 | Baer et al. | 715/205 |
| 2003/0135495 | A1 * | 7/2003 | Vagnozzi | 707/3 |
| 2006/0215656 | A1 * | 9/2006 | Shirogane | 370/389 |
| 2007/0050467 | A1 | 3/2007 | Borrett et al. | |
| 2007/0086031 | A1 | 4/2007 | Li | |
| 2007/0112844 | A1 * | 5/2007 | Tribble et al. | 707/102 |
| 2007/0223050 | A1 * | 9/2007 | Someya et al. | 358/404 |
| 2007/0234140 | A1 * | 10/2007 | Lee et al. | 714/715 |
| 2007/0266253 | A1 | 11/2007 | Fukasawa | |
| 2008/0104542 | A1 * | 5/2008 | Cohen et al. | 715/810 |
| 2008/0151284 | A1 | 6/2008 | Morales et al. | |

(Continued)

OTHER PUBLICATIONS

Blackwell, G, "Google Desktop—A Different Kind of Search", [online], [Retrieved on Nov. 9, 2009]. Retrieved from the Internet at <URL: http://www.smallbusinesscomputing.com/biztools/article.php/3453101>, 8 pp.

(Continued)

*Primary Examiner* — Hung T Vy
*Assistant Examiner* — Tuan A Pham
(74) *Attorney, Agent, or Firm* — Janaki K. Davda; Konrad, Raynes, Davda & Victor LLP (57) ABSTRACT

Provided are techniques for retrieving a document that includes for each page an area that is ignored by applications that process the document and that includes a different internal index set associated with each subset of pages of the document, wherein each different internal index set is associated with an area and stores indexes, and wherein each of the indexes consists of a name-value pair. Then, for each page in the document, it is determined whether the page is associated with an internal index set; and, in response to determining that the page is associated with an internal index set, one or more name-value pairs from the internal index set are extracted, wherein each of the one or more name-value pairs provides specific information about the document for use in identifying the document.

15 Claims, 8 Drawing Sheets

(56) References Cited

U.S. PATENT DOCUMENTS

| | | | |
|---|---|---|---|
| 2008/0263032 A1* | 10/2008 | Vailaya et al. | 707/6 |
| 2008/0270462 A1* | 10/2008 | Thomsen | 707/103 R |
| 2009/0019010 A1* | 1/2009 | Takeya | 707/3 |
| 2009/0024414 A1* | 1/2009 | Mansour et al. | 705/3 |
| 2009/0024650 A1* | 1/2009 | Kamani et al. | 707/102 |
| 2009/0024854 A1 | 1/2009 | Fukasawa | |
| 2009/0044095 A1* | 2/2009 | Berger et al. | 715/226 |
| 2009/0157711 A1* | 6/2009 | Baer et al. | 707/101 |
| 2010/0245938 A1* | 9/2010 | Coley et al. | 358/474 |

OTHER PUBLICATIONS

IBM Corp., "Indexing PDF Documents without File Size Creep", Database: ip.com, ip.com No. IPCOM000012579D, IBM, May 16, 2003, 9 pp.

PCT International Search Report and Written Opinion, Mar. 3, 2011, for International Application No. PCT/EP2010/069329, Total 9 pp.

Shepherd, M., C. Watters, and J. Young, "Context Thesaurus for the Extraction of Metadata from Medical Research Papers", Proceedings of the 37th Hawaii International Conference on System Sciences, © 2004 IEEE, Total 8 pp.

* cited by examiner

```
/PieceInfo <</ODIndexes <</Private
                        <</AccountNo(7558-1)
                          /Name(David Smith)
                          /RunDate(03 AUG 2004)
                       >>
                       /LastModified(D:19700101000000Z)
                 >>
       >>
       <</AnotherEntry <</Private(Example)
                       /
LastModified(D:20090406113800-06'00')
                       >>
       >>
```

| Document Identifier | AccountNo | Name | RunDate |
|---|---|---|---|
| ABC | 7558-1 | David Smith | 03 AUG 2004 |

INDEXING DOCUMENTS USING INTERNAL INDEX SETS

BACKGROUND

1. Field

Embodiments of the invention relate to indexing documents using internal index sets.

2. Description of the Related Art

Documents, such as WORD® documents and EXCEL® documents, may have associated document meta data (e.g., who created the document and a creation date) that may be used for indexing documents (WORD and EXCEL are trademarks of Microsoft Corporation in the United States, other countries, or both). However, the available meta data is limited, and it would be useful for a user to customize terms for indexing these documents.

In addition, ADOBE® Portable Document Format (PDF) is a document architecture from Adobe Systems Incorporated in 1993 (ADOBE is a trademark of Adobe Systems Incorporated in the United States, other countries, or both). Originally created for printing, PDF documents are now also found in great numbers on the internet. In fact, PDF has become the de facto standard for internet based documents.

Because of the internet explosion, companies are quickly moving away from their older proprietary print formats in favor of PDF. This move allows them to produce printed copies of statements (e.g., invoices) as well as host the same version of the statement for viewing on the Web (also known as the World Wide Web or WWW). Prior to this move, documents were converted from the proprietary data type to PDF. As part of this move, companies are uncovering architectural issues with the PDF format as it relates to massive, single PDF documents that include multiple statements. This type of PDF document is called a PDF report document.

For example, in order to access a single statement within a PDF report document, unique pieces of information (i.e., indexes, also sometimes called meta data) are extracted so that a user can search for a particular document. This technique of breaking up the PDF report document into individual documents and extracting indexes for each of the individual documents is called indexing. The typical technique for extracting indexes from a PDF report document is to search through the PDF report looking for text in certain predetermined locations of the PDF report document, and these predetermined locations are called the bounding boxes of the text in PDF documents.

In order to extract the text, each page of the PDF document is first graphically rendered. Then, each word of each PDF page is examined in order to determine if the word is inside a bounding box. This technique requires numerous graphic, font and floating point operations, which cause it to be slow, especially as PDF documents have become larger. That is, known indexers use graphical techniques to extract data, which is very resource intensive and prone to errors (i.e., due to font metrics, bounding boxes with rounding errors, etc.).

Thus, there is a need for indexing documents using internal index sets.

BRIEF SUMMARY

Provided are a method, computer program product, and system for retrieving a document that includes for each page an area that is ignored by applications that process the document and that includes a different internal index set associated with each subset of pages of the document, wherein each different internal index set is associated with an area and stores indexes, and wherein each of the indexes consists of a name-value pair. Then, for each page in the document, it is determined whether the page is associated with an internal index set; and, in response to determining that the page is associated with an internal index set, one or more name-value pairs from the internal index set are extracted, wherein each of the one or more name-value pairs provides specific information about the document for use in identifying the document.

BRIEF DESCRIPTION OF THE SEVERAL VIEWS OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
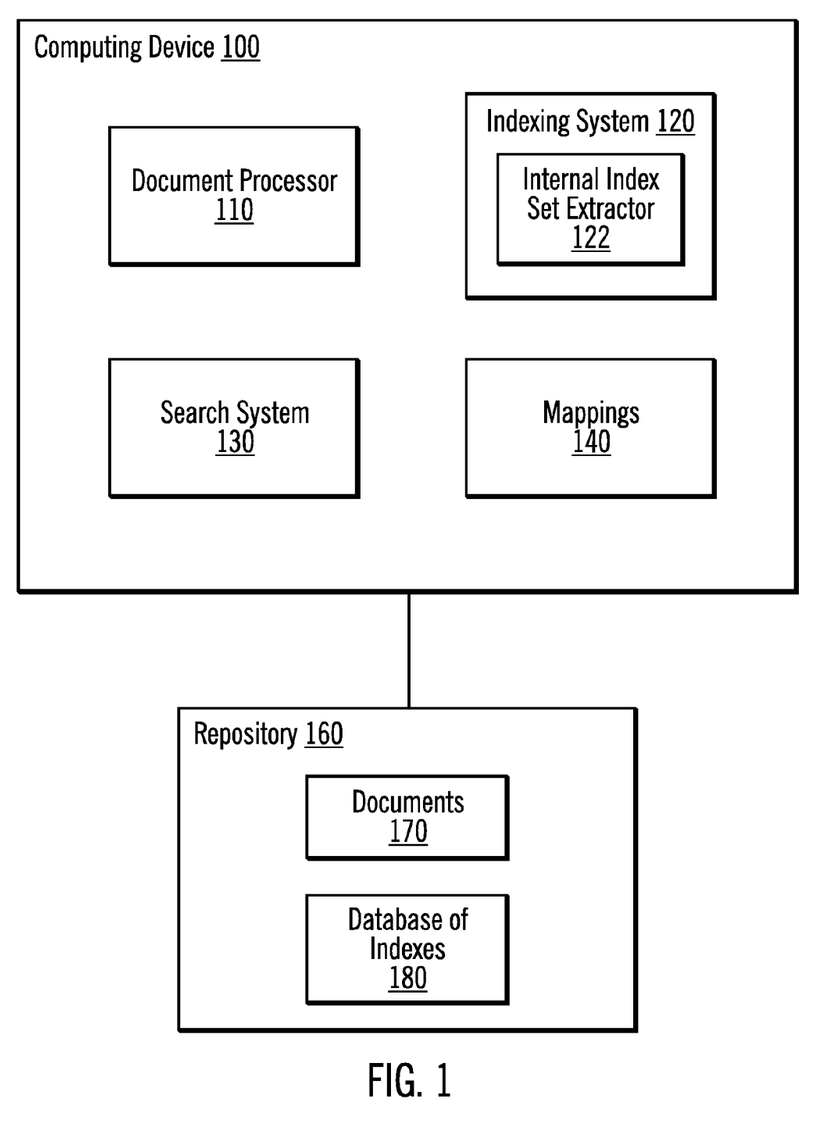
FIG. 1 illustrates, in a block diagram, a computing environment in accordance with certain embodiments of the invention.

FIG. 1 illustrates, in a block diagram, a computing environment in accordance with certain embodiments of the invention. A computing device 100 is coupled to a repository 160. The computer 100 includes a document processor 110, an indexing system 120, a search system 130, and mappings 140. The indexing system 120 includes an internal index set extractor 122. The repository 160 includes documents 170 and a database of indexes 180 ("database" herein). In certain embodiments, the documents 170 include PDF report documents, WORD® documents, and EXCEL® documents. In certain embodiments, the document processor 110 creates documents in PDF format, WORD® format or EXCEL® format.

In certain embodiments, the internal index sets reside in a predetermined structure. In certain embodiments, the internal index sets are non-graphical structures. In certain embodiments, each internal index set has the following characteristics for a document:

Characteristics

1) The internal index set is located in a structure associated with an area of a page of a document. Each page of the document includes an area that is ignored (i.e., not observed) by applications processing the document, such as document readers, document converters, or other tools/applications that process the document, and the internal index set is stored in this area. Indexes are stored in the internal index sets. In certain embodiments, each index consists of a name-value pair (e.g., "AccountNo"/ "7558-1"). The name-value pair may later be used to search for documents containing this name-value pair. That is, the name-value pair provides specific information about a document that may be used to identify the document in response to a search request. For example, PDF documents, WORD® documents, and EXCEL® documents each have such an area that could contain the internal index set described herein.

2) The structure in which to store the internal index set is associated with one or more pages of the document. That is, an internal index set associated with a page of a document is relevant for that page and all subsequent pages until another internal index set within the document or the end of the document is reached. For example, in a ten page document containing two internal index sets, a first internal index set associated with page one is applicable to pages one through five of the document, and a second internal index set associated with page six is applicable to pages six through ten of the document. For example, for PDF documents, WORD® documents, and EXCEL® documents, such a structure can be associated with any page of the document.

3) The internal index set can reside in the document without harming the integrity of the document or interfering with any application that may process the document (e.g., document readers and document converters). For example, this is true for PDF documents, WORD® documents, and EXCEL® documents.

In certain embodiments in which the document 170 is a PDF document, an internal index set can be accessed without accessing a bounding box. In certain embodiments, indexes are stored in the internal index sets as well as being available in bounding boxes.

Figure 2:
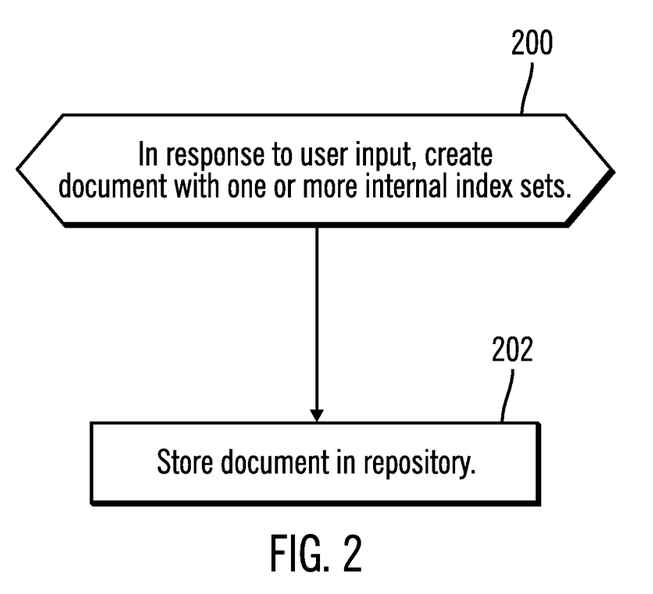
FIG. 2 illustrates, in a flow diagram, creation of internal index sets in accordance with certain embodiments.

FIG. 2 illustrates, in a flow diagram, creation of internal index sets in accordance with certain embodiments. Control begins at block 200. In block 200, in response to user input, the document processor 110 creates a document 170 with one or more internal index sets in the document. In block 202, the document processor 110 stores the document 170 in the repository 160. In certain embodiments, the process of storing the document 170 includes indexing the document using the indexing system 120.

With embodiments, the indexes for the document 170 are stored in one or more areas inside the document 170 when the document 170 is created. Document producers know what data is useful within a document 170, and, therefore, can create one or more internal index sets containing indexes (i.e., name-value pairs) in one or more areas within the document 170, as well as placing the index values into the content stream of the document.

Figure 3:
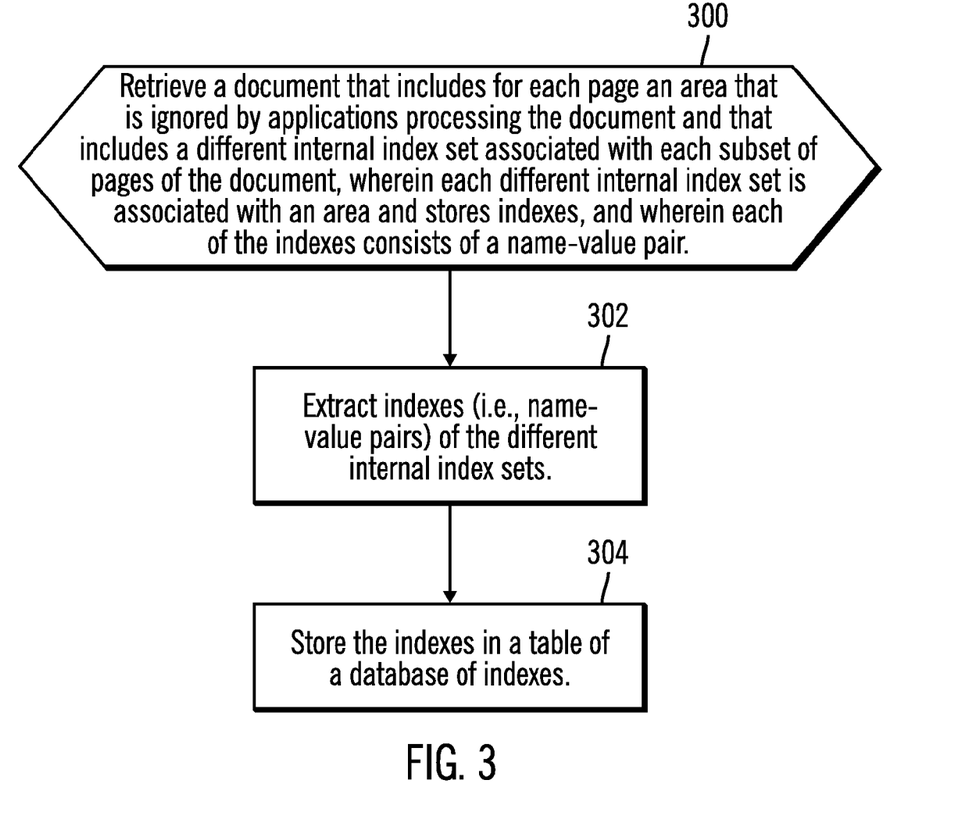
FIG. 3 illustrates, in a flow diagram, use of internal index sets to build a database of internal index sets in accordance with certain embodiments.

FIG. 3 illustrates, in a flow diagram, use of internal index sets to build a database of internal index sets in accordance with certain embodiments. Control begins at block 300 with the indexing system 120 retrieving a document 170 that includes for each page an area that is ignored by applications processing the document 170 and that includes a different internal index set associated with each subset of pages of the document 170, wherein each different internal index set is associated with an area and stores indexes, and wherein each of the indexes consists of a name-value pair. In block 302, the internal index set extractor 122 extracts indexes (i.e., name-value pairs) from the different internal index sets. In certain embodiments, the internal index extractor 122 uses Application Programming Interfaces (APIs) to extract the indexes.

In block 304, the indexing system 120 stores the indexes (i.e., name-value pairs) in a table of the database 180. In certain embodiments, for each internal index set, there is one row in the database 180, and there are columns that correspond to the name of each index. That is, for a name-value pair, the index name corresponds to a column name in the table, and the index value corresponds to a value stored in a row for a column having the name. In certain embodiments, the index values are in character format, and the indexing system 120 uses mappings 140 to convert the index values to other formats as needed to store the index values in the database 180. For example, the indexing system 120 may convert an account number from character format to integer format and store the integer format in the database 180.

Thus, embodiments remove the need for searching for text, determining bounding boxes, and performing floating point calculations. The indexing system 122 also does not need to know how many name-value pairs are contained within the document 170. Without the need for these tasks, the indexing system 122 is less complex and performance in indexing the document 170 improves.

Moreover, for all types of documents, embodiments allow customizing terms for indexing these documents.

In certain embodiments, an internal index set that meets the three characteristics described above is a page-piece dictionary.

In embodiments in which the document 170 is a PDF document, a page-piece dictionary may be used to store indexes. That is, the page-piece dictionary is the structure storing one or more internal index sets.

Figure 4:
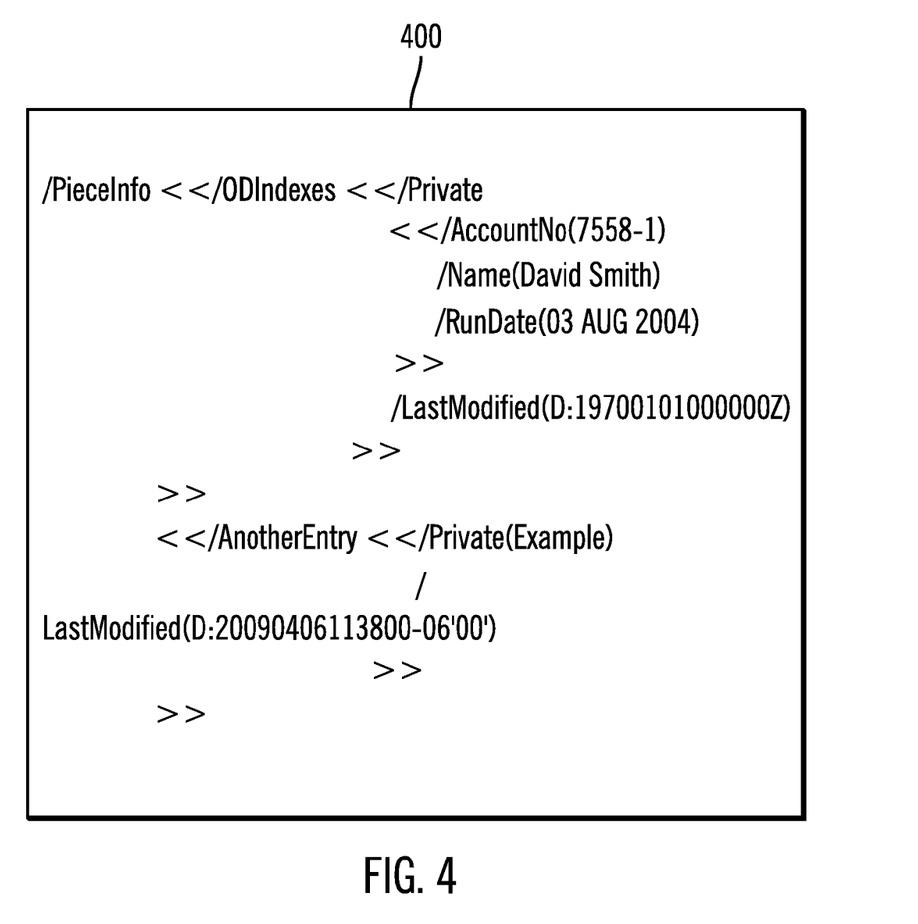
FIG. 4 illustrates an example page-piece dictionary in accordance with certain embodiments.

FIG. 4 illustrates an example page-piece dictionary 400 in accordance with certain embodiments. The page-piece dictionary contains an application data dictionary, and an application data dictionary may be a PDF structure which can store the name-value pairs containing the index names and index values that are extracted as the indexes.

The key word PieceInfo identifies this object as a page-piece dictionary. In the example of FIG. 4, the key word ODIndexes identifies an entry containing the indexes for the document. The same key word is used by the indexing system 120 creating the indexes, and the internal index set extractor 122 that is extracting the indexes. The use of the same key word association enables the internal index set extractor 122 to locate the correct entry in the page-piece dictionary that contains the indexes.

In certain embodiments, the key words Private and Last-Modified are specified by the PDF architecture for the application data dictionary. The words "AccountNo", "Name", and "RunDate" are the index names. The text "7558-1", "David Smith", and "03 AUG 2004" are the index values. The index names and index values are structured in such a way that it is clear which index name is associated with which index value. The key word "AnotherEntry" contains another entry in the page-piece dictionary that is not relevant to extracting indexes, but is shown to illustrate the fact that the page-piece dictionary can have multiple entries used by different applications for different purposes. For example, the indexing system 120 uses the internal index set, but another application may use the AnotherEntry data.

The page-piece dictionary can be created as part of a page object. Any page object can contain a single page-piece dictionary. A page object may be described as a dictionary specifying the attributes of a single page of a document.

Figure 5:
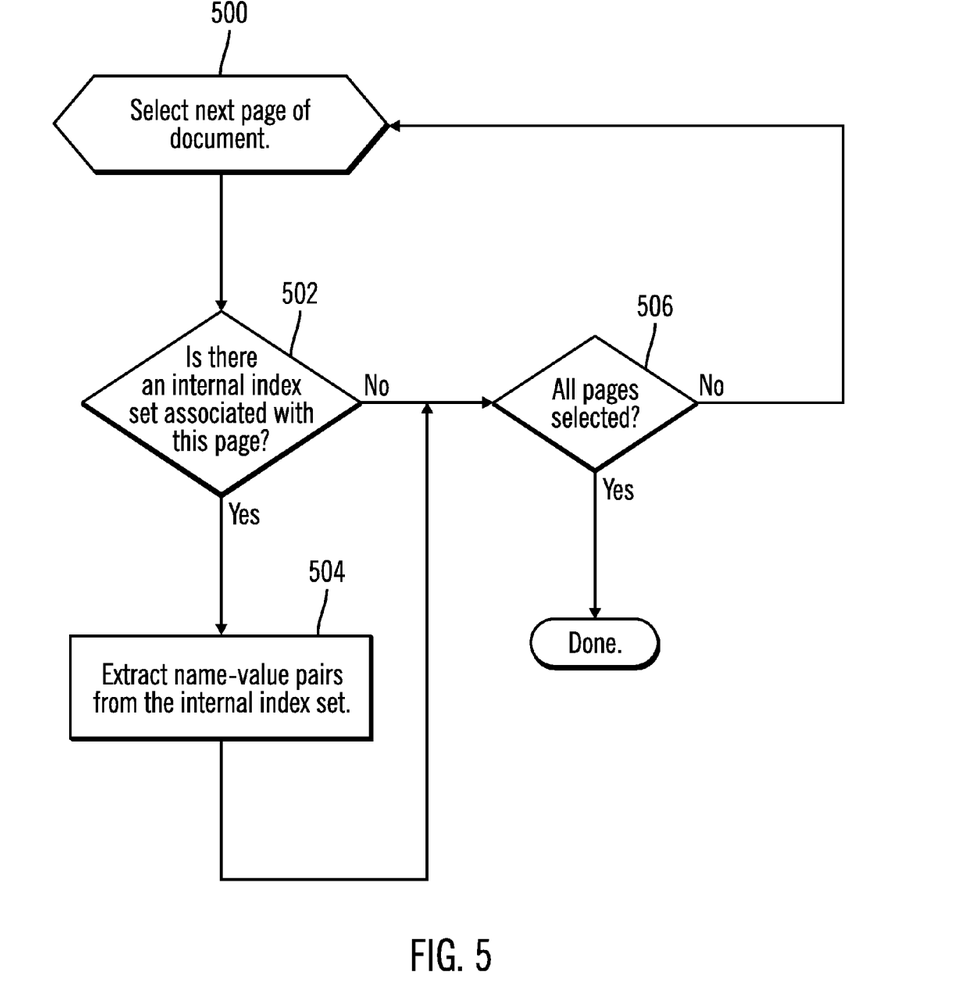
FIG. 5 illustrates, in a flow diagram, processing performed by an internal index set extractor in accordance with certain embodiments.

FIG. 5 illustrates, in a flow diagram, processing performed by the internal index set extractor 122 in accordance with certain embodiments. Control begins in block 500 with the internal index set extractor 122 selecting a next page of the document 170. In block 502, the internal index set extractor 122 determines whether there is an internal index set associated with the page. In certain embodiments, multiple internal index sets may be included in the area on one page (e.g., in FIG. 4, instead of "AnotherEntry", there may be an "ODIndexes2" entry). If so, processing continues to block 504, otherwise, processing continues to block 506. For example, in block 502, the internal index set extractor 122 may use an API to look for a key word identifying an internal index set (e.g., ODIndexes) in the area that is not observed on the page.

In block 504, the internal index set extractor 122 extracts name-value pairs from the internal index set. For example, the internal index set extractor 122 may use an API to retrieve each name-value pair and may then use APIs to extract the name and value of each name-value pair. For example, when the name-value pair "AccountNo"/"7558-1" is retrieved, "AccountNo", and "7558-1" are extracted. From block 504, processing continues to block 506.

In block 506, the internal index set extractor determines whether all pages of the document 170 have been selected. If so, processing is done, otherwise, processing loops back to block 500 to select another page of the document 170.

Thus, embodiments enable indexes to be associated with a page in a non-graphical location in a document 170. Embodiments extract text information from documents 170, to include but not to be limited to indexes. With embodiments, index values are embedded in documents 170.

Figure 6:
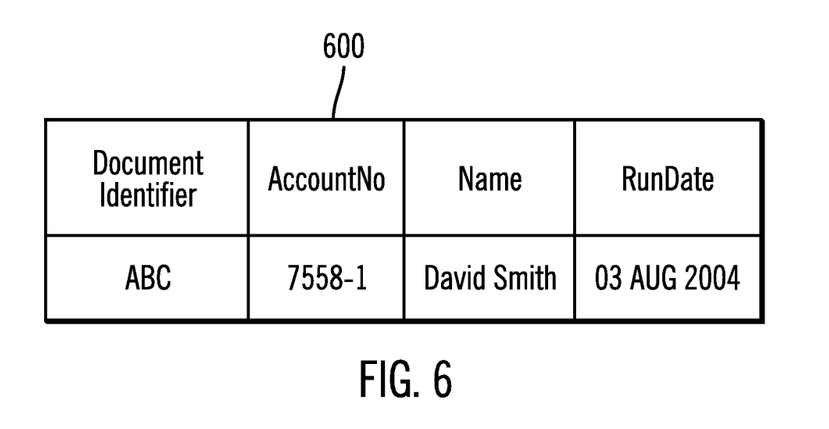
FIG. 6 illustrates an example table in a database that stores indexes from one or more internal index sets in accordance with certain embodiments.

FIG. 6 illustrates an example table 600 in the database 180 that stores name-value pairs from one or more internal index sets in accordance with certain embodiments. In FIG. 6, the table 600 stores index names and index values from the ODIndexes entry illustrated in FIG. 4. Each row in table 600 has a column for a document identifier (for the document 170 storing the indexes in this row) and a column for each index name described in FIG. 4. For example, for a document 170 including ten internal index sets, table 600 would include ten rows, with one row corresponding to each of the internal index sets.

Figure 7:
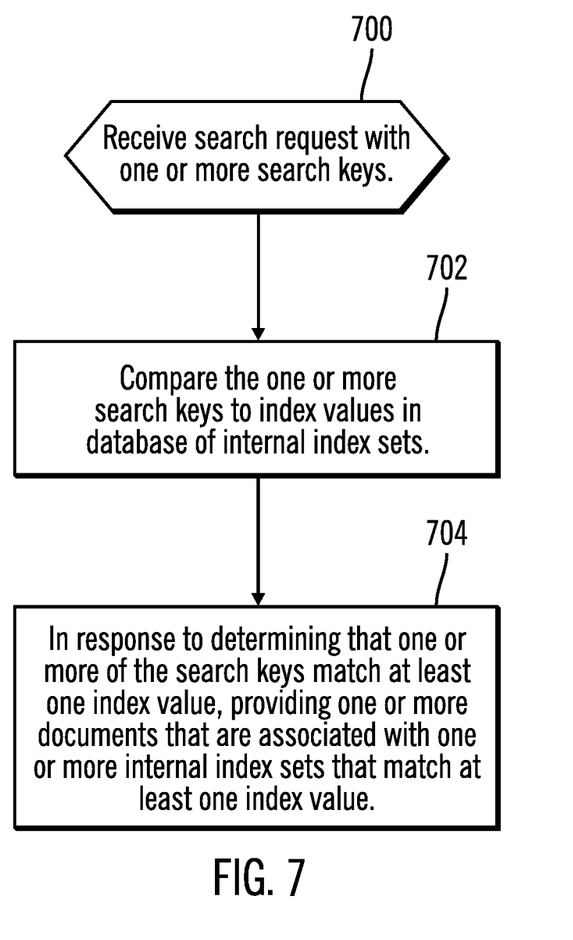
FIG. 7 illustrates, in a flow diagram, use of a database of internal index sets in accordance with certain embodiments.

FIG. 7 illustrates, in a flow diagram, use of the database of internal index sets 170 in accordance with certain embodiments. Control begins at block 700 with a search system 130 receiving a search request with one or more search keys. In block 702, the search system 130 compares the one or more search keys to the index values in the database of internal index sets 170. In block 704, in response to determining that one or more of the search keys match at least one index value, the search system 130 provides one or more documents 170 that include one or more internal index sets that match the at least one index value. For example, if a search key is "7558-1", a document with an internal index set that matches the index value "7558-1" would be provided (e.g., to a user).

Thus, certain embodiments provide a unique way to enable faster and more accurate indexing of documents 170. Certain embodiments combine several ideas to use internal index sets. One idea is to have the document producers duplicate the indexes in the form of internal index sets. That is, in addition to, or instead of, placing the indexes on the viewable page that is in a content stream, the indexes are copied to a pre-determined (e.g., known by the indexing system 12) area on a page of a document 170 that does not require graphics operations to retrieve.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system that executes or runs instructions, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 8:
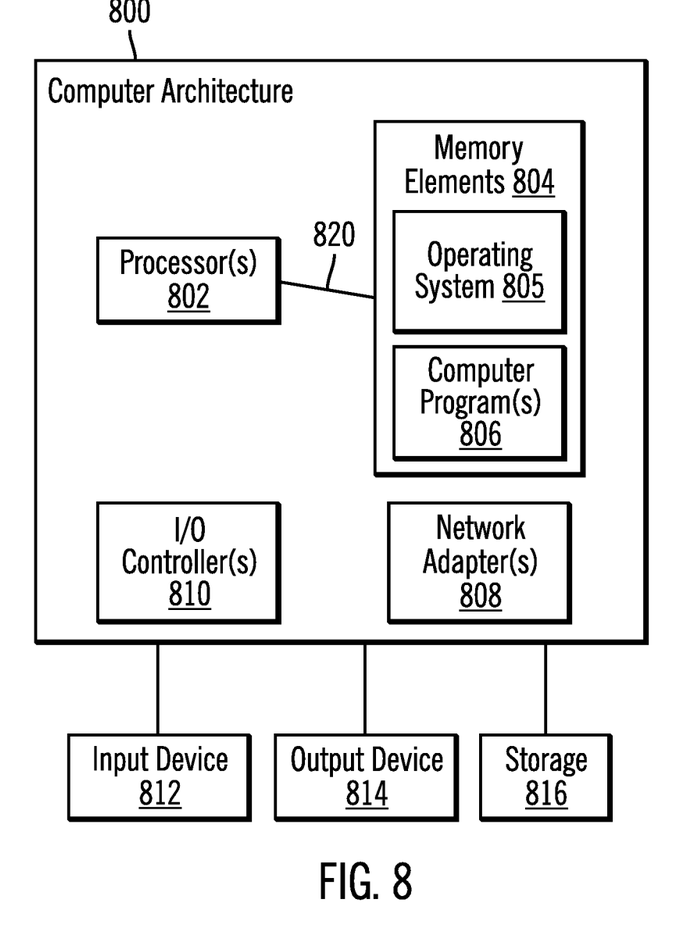
FIG. 8 illustrates a computer architecture that may be used in accordance with certain embodiments.

FIG. 8 illustrates a computer architecture 800 that may be used in accordance with certain embodiments. Computing device 100 may implement computer architecture 800. The computer architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening networks. Modems, cable modem and Ethernet cards are just a few of the currently available types of network adapters 808.

The computer architecture 800 may be coupled to storage 816 (e.g., a non-volatile storage area, such as magnetic disk drives, optical disk drives, a tape drive, etc.). The storage 816 may comprise an internal storage device or an attached or network accessible storage. Computer programs 806 in storage 816 may be loaded into the memory elements 804 and executed by a processor 802 in a manner known in the art.

The computer architecture 800 may include fewer components than illustrated, additional components not illustrated herein, or some combination of the components illustrated and additional components. The computer architecture 800 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A computer-implemented method, comprising:
    obtaining, using a processor of a computer, a document with multiple subsets of pages that includes a different internal index set associated with each subset of pages from among the multiple subsets of pages, wherein each different internal index set is located within a first area on a page within the associated subset of pages, is relevant to the page and subsequent pages in the associated subset of pages until one of another internal index set within the document is found and an end of the document is reached, and includes one or more name-value pairs, and wherein the first area is ignored by an application that processes a second area of the document;
    extracting the one or more name-value pairs from each different internal index set, wherein each of the one or more name-value pairs provides specific information about the document for use in identifying the document; and
    storing the extracted one or more-name value pairs in a table in a database to enable subsequent searching for the document, wherein, for a name-value pair, the name corresponds to a column name in the table, and the value corresponds to a value stored in a row for a column having the name.

2. The computer-implemented method of claim 1, wherein the extracting further comprises using Application Programming Interfaces (APIs) to extract the one or more name-value pairs.

3. The computer-implemented method of claim 1, wherein the application is one of a document reader and a document converter.

4. The computer-implemented method of claim 1, further comprising:
in response to receiving a search request with one or more search keys, comparing the one or more search keys to values in the database; and
in response to determining that one or more of the search keys match at least one value, providing one or more documents that are associated with one or more internal index sets that have the at least one value.

5. The computer-implemented method of claim 1, further comprising:
in response to receiving a search request, identifying the document based on the search request matching at least one name-value pair stored in the database, wherein the at least one name-value pair is in an internal index set in the document.

6. A system, comprising:
a computer processor; and
storage coupled to the computer processor, wherein the storage stores a program, and wherein the computer processor executes the program to perform operations, wherein the operations comprise:
obtaining a document with multiple subsets of pages that includes a different internal index set associated with each subset of pages from among the multiple subsets of pages, wherein each different internal index is located within a first area on a page within the associated subset of pages, is relevant to the page and subsequent pages in the associated subset of pages until one of another internal index set within the document is found and an end of the document is reached, and includes one or more name-value pairs, and wherein the first area is ignored by an application that processes a second area of the document;
extracting the one or more name-value pairs from each different internal index set, wherein each of the one or more name-value pairs provides specific information about the document for use in identifying the document; and
storing the extracted one or more-name value pairs in a table in a database to enable subsequent searching for the document, wherein, for a name-value pair, the name corresponds to a column name in the table, and the value corresponds to a value stored in a row for a column having the name.

7. The system of claim 6, wherein the operations for extracting further comprise using Application Programming Interfaces (APIs) to extract the one or more name-value pairs.

8. The system of claim 6, wherein the application is one of a document reader and a document converter.

9. The system of claim 6, wherein the operations further comprise:
in response to receiving a search request with one or more search keys, comparing the one or more search keys to values in the database; and
in response to determining that one or more of the search keys match at least one value, providing one or more documents that are associated with one or more internal index sets that have the at least one value.

10. The system of claim 6, wherein the operations further comprise:
in response to receiving a search request, identifying the document based on the search request matching at least one name-value pair stored in the database, wherein the at least one name-value pair is in an internal index set in the document.

11. A computer program product comprising:
a non-transitory computer readable storage medium including a computer readable program, wherein the computer readable program, when executed by a processor on a computer, causes the computer to:
obtain a document with multiple subsets of pages that includes a different internal index set associated with each subset of pages from among the multiple subsets of pages, wherein each different internal index set is located within an area on a page within the associated subset of pages, is relevant to the page and subsequent pages in the associated subset of pages until one of another internal index set within the document is found and an end of the document is reached, and includes one or more name-value pairs, and wherein the first area is ignored by an application that processes a second area of the document; and
extract the one or more name-value pairs from each different internal index set, wherein each of the one or more name-value pairs provides specific information about the document for use in identifying the document; and
store the extracted one or more-name value pairs in a table in a database to enable subsequent searching for the document, wherein, for a name-value pair, the name corresponds to a column name in the table, and the value corresponds to a value stored in a row for a column having the name.

12. The computer program product of claim 11, wherein the extracting further comprises using Application Programming Interfaces (APIs) to extract the one or more name-value pairs.

13. The computer program product of claim 11, wherein the application is one of a document reader and a document converter.

14. The computer program product of claim 11, wherein the computer readable program, when executed by the processor on the computer causes, the computer to:
in response to receiving a search request with one or more search keys, compare the one or more search keys to values in the database; and
in response to determining that one or more of the search keys match at least one value, provide one or more documents that are associated with one or more internal index sets that have the at least one value.

15. The computer program product of claim 11, wherein the computer readable program, when executed by the processor on the computer causes, the computer to:
in response to receiving a search request, identify the document based on the search request matching at least one name-value pair stored in the database, wherein the at least one name-value pair is in an internal index set in the document.

* * * * *